Sept. 29, 1925.  
F. W. HUBER  
1,555,800  
METHOD OF LOCATING WATER BEARING STRATA IN BORE HOLES  
Filed Aug. 26, 1924  2 Sheets-Sheet 1
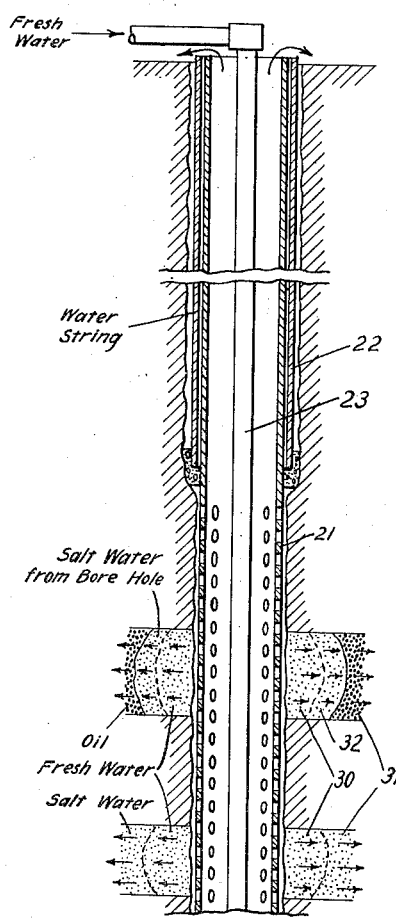
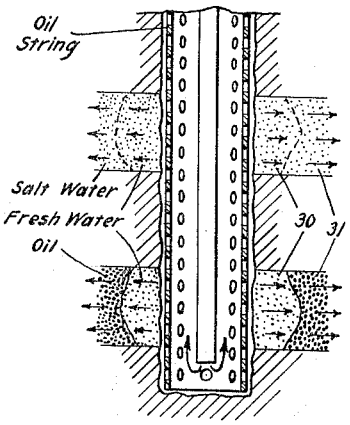
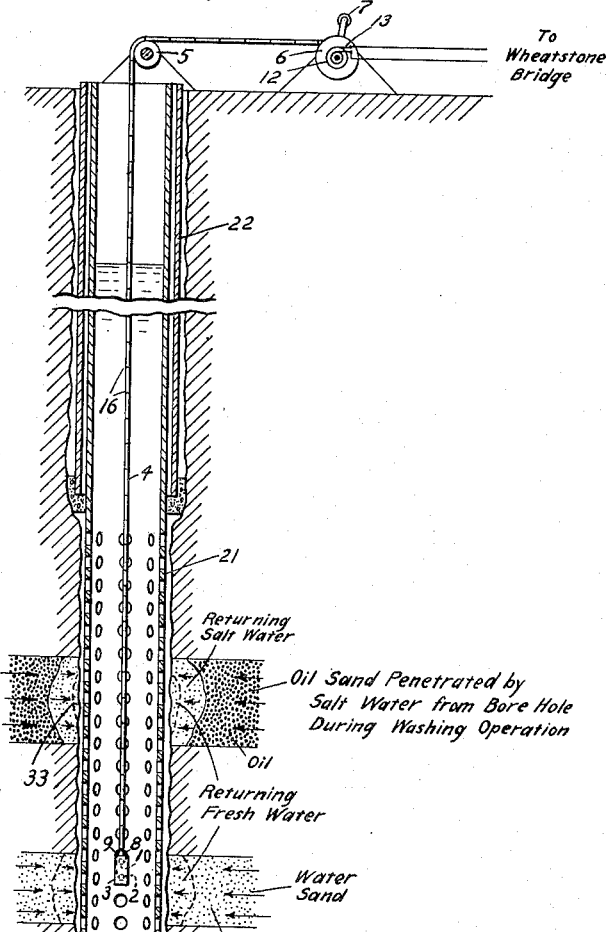
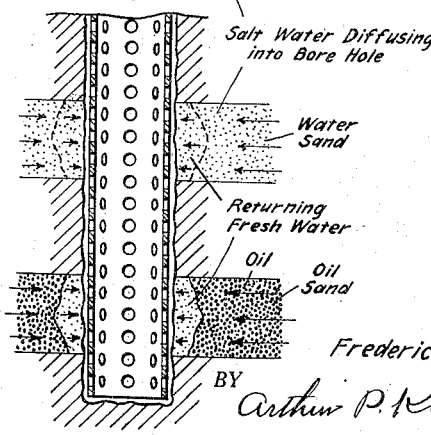
INVENTOR.  
Frederick W. Huber  
BY  
Arthur P. Knight  
ATTORNEY.

Sept. 29, 1925.                                        1,555,800
F. W. HUBER
METHOD OF LOCATING WATER BEARING STRATA IN BORE HOLES
Filed Aug. 26, 1924          2 Sheets-Sheet 2
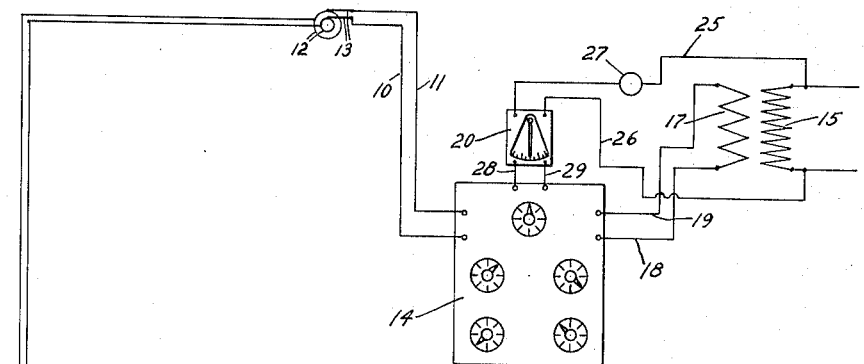
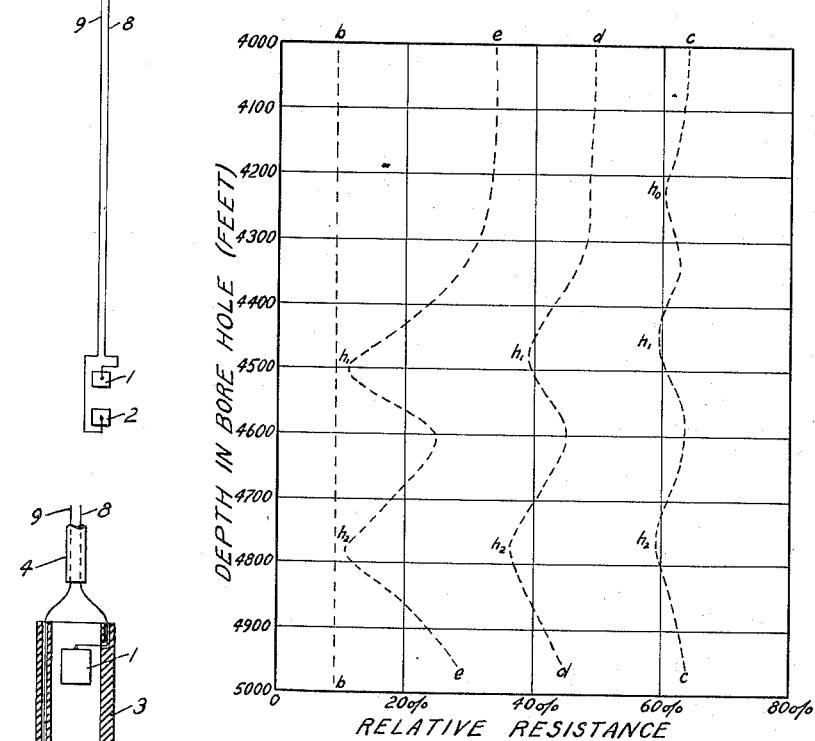
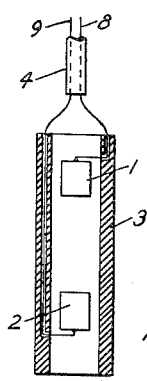
INVENTOR.
Frederick W. Huber
BY Arthur P. Knight
ATTORNEY.

Patented Sept. 29, 1925.

1,555,800

UNITED STATES PATENT OFFICE.

FREDERICK W. HUBER, OF RIVERSIDE, CALIFORNIA.

METHOD OF LOCATING WATER-BEARING STRATA IN BORE HOLES.

Application filed August 26, 1924. Serial No. 734,174.

*To all whom it may concern:*

Be it known that I, FREDERICK W. HUBER, a citizen of the United States, residing at Riverside, in the county of Riverside, State of California, have invented a new and useful Method of Locating Water-Bearing Strata in Bore Holes, of which the following is a specification.

This invention relates to a method for locating water bearing strata in bore holes in oil or gas bearing formations and the main object of the invention is to provide a means and method whereby the location of such water bearing strata may be positively determined.

In boring wells for oil or gas production considerable difficulty has arisen from the presence of water bearing strata encountered in the course of drilling or boring of such wells. In order to provide for effective production of petroleum from such wells it is necessary to prevent entrance of water from the water bearing strata to the well casing, this generally being provided for by cementing off the well in an appropriate manner as well understood in the art. In order to provide for effective cementing off of water from the well it is necessary to determine in the first place the location of the water bearing strata and this has been a matter of considerable difficulty, particularly where the wells are drilled or bored in such manner that the bore is filled or partly filled with water or mud during the drilling operation. Under such circumstances and indeed under any circumstances as have heretofore existed the determination of water bearing strata has been a matter of great difficulty, expense, and uncertainty. My invention obviates this difficulty by providing for positive determination of the location of water bearing strata by the method hereinafter set forth, said method in its preferred form being based upon the measurement of electrical conductivity of the liquid in the well at various levels under specified conditions.

In carrying out my method I provide for establishing within the bore hole, a column of liquid presenting a sharp difference in concentration at those portions opposite water bearing strata as compared with the rest of the liquid in the hole, and I further provide means for measuring the electrical conductivity of the liquid at different parts of the said column of liquid in the hole thereby determining the location of the water bearing strata.

The oil bearing zones in an oil field consist, usually, of alternating strata of oil sand and impermeable shale or clay and sometimes intermediate sands which carry saline water. The oil in the oil bearing sand often has at its base a very saline body of water known geologically as "edge water."

If an oil or gas bore is made and the water bearing sand is not sealed off it will allow the water to enter the oil sand and crowd the oil away from the bore and it will be difficult to make the well produce. If production can be obtained the oil will be mixed with water and will have to be de-emulsified.

On the other hand supposing there is no intermediate water sand and the well is on production: As the oil is drawn from say one or more sands of the series the edge water will come nearer and nearer the bore until finally it will enter the bore and inundate the remaining oil sands and the production will cease. This case illustrates the problem of a great many oil fields which have been developed too intensely. The locating of the strata making the difficulty constitutes one of the most serious problems in the oil industry.

The oil bearing zone is sealed off from the superficial barren formation by a string of casing called the "water string" which is generally cemented into place. The oil zone is cased with a string of perforated pipe called the "oil string" to hold the bore walls up. When water breaks into a bore hole it fills the hole with saline water up to a point where the column of fluid in the bore hole balances the head (or hydrostatic pressure) of the water in the sand. The determining of this level is not necessary in the application of my method. This point is called "the fluid level." The water standing in the hole under these conditions is very saline and is in static equilibrium with respect to the water in the sand.

In order to determine the location of the water bearing strata according to my invention it is first necessary to produce a sharp difference in concentration opposite the sand supplying the water or the point of ingress of the water, and the rest of the water column in the hole. I insert a string of tubing (which I term the "fresh water line") into the bore hole extending from top to bottom, connect this tubing with a fresh water supply and pump the fresh water down into the bore until it flows over the top of the hole and until the saline water is displaced by the fresh water. The tubing (fresh water line) is then withdrawn from the bore hole and by reason of the diffusion and convection of salt water from water bearing strata into the column of fresh water in the bore hole there is produced opposite each water sand or water stratum, a zone of high saline concentration relative to the rest of the water column. This zone opposite the point of ingress I then locate with accuracy by running into the hole on a properly insulated conductor cable a special electrode means, and reading the resistance for each depth interval, for example, by balancing the solution resistance on a Wheatstone bridge. The readings are recorded and opposite the water sand a sharp decrease in resistance is noted. By plotting the resistance against the depth, a curve is obtained which throws these differences into conspicuous relief. In order to more accurately locate the water stratum and prevent errors due to temperature conditions I prefer to perform a series of measuring operations on the column of liquid in the bore hole, the liquid being bailed out to a lower level after each measuring operation, the resultant measurements for different heights in the bore hole being plotted so as to give a series of check readings which eliminate accidental abnormalities, thereby giving a true indication of the location of the water bearing strata or stratum.

The accompanying drawings illustrate the method and means by which my process may be carried out and referring thereto:

Fig. 1 is a diagrammatic section of a bore hole showing means for introducing fresh water in the bore hole.

Fig. 2 is a similar section of the bore hole, the water introducing piping having been removed and the resistance measuring means having been brought to position for making a measurement.

Fig. 3 is a diagram of circuit connections for the measuring appliance.

Fig. 4 is a vertical section of the electrode means for applying the measuring electrical potential to any part of the column of liquid in the bore hole.

Fig. 5 is a curve sheet such as would be made in plotting the resistance of the liquid in the bore hole at different levels.

In order that my method of locating water bearing strata in bore holes may be properly understood I will first describe certain apparatus or appliances used in connection therewith in the preferred mode of execution of the process, such appliances being shown in Figs. 2, 3, and 4. The purpose of these appliances is to measure the conductivity of different parts of a liquid column established in the bore hole as hereinafter described and such appliances include electrode means adapted to be exposed in contact with such liquid and means for positioning said electrode means at different heights in the bore hole, circuit means, including a source of current for applying a definite electrical potential difference to said electrodes and means for measuring the current in such circuit means and thereby determining the resistance and hence the concentration of the liquid present between the said electrodes.

The electrodes indicated at 1 and 2 may be mounted in any suitable manner for example within a cylinder 3 which may be of insulating material, the electrodes in any case being insulated from one another and being mounted at a definite distance apart and the said cylinder being open, and preferably open at both ends, so as to allow free access of liquid to said electrodes. The electrodes 1 and 2 and their supporting and enclosing means 3 are mounted on any suitable flexible suspension means such as a cable 4 which passes over suitable sheave 5 at the top of the bore and is connected to suitable means such as a reel 6 having suitable means such as handle 7 for operating the same to wind the cable on the reel or to unwind it therefrom, to cause ascent or descent of the electrode means in the bore hole. Said cable may be provided with markers 16 whereby it is marked off into convenient lengths for measuring the depth at which the electrode means is located at any particular instant of time or any other suitable means may be provided for indicating such depth. Electric circuit wires indicated at 8 and 9 are connected to the respective electrodes 1 and 2 and may form a part of the cable (said cable for example comprising two heavily insulated wires or conductors which are encased in a heavily insulated sheath) or may be connected thereto, said cable and wires being of sufficient length to permit the electrode means to be lowered to any part of a bore hole and to maintain electric connection with the electrodes in all operative positions thereof. The conductors 8 and 9 are preferably formed as steel wires or cables, for the sake of strength and in that case are self-supporting, being either embedded in insulation to form a single conductor cable or being separately insulated and extending side by side to form two conductor cables. Said wires 8 and 9 are connected at their upper ends to wires 10 and 11 forming a part of the electrical measuring circuit as hereinafter described, the connection for the respective wires 8 and 9, and 10 and 11 being, for example, by means of collector rings 12 and brushes 13, so as to admit operation of the reel 6 in raising or lowering the electrode means while maintaing such electric connection. Any suitable circuit means may be provided for applying the electric circuit or potential to the wires leading to the electrodes so as to measure the resistance of the medium presented between the electrodes, for example, as shown in Fig. 3, said electric measuring means may comprise a Wheatstone bridge 14 of usual construction, which is connected to a source of current or electric potential and to the circuit wires 10 and 11. It is essential to the present invention that alternating current should be used in measuring the electrical resistance so as to avoid errors which would result from polarization in case direct current were used, and it is also important that no ground connections should be present, and in order to satisfy these requirements I prefer to use as a source of current a transformer whose primary winding 15 is connected to any suitable alternating current supply circuit, either single phase or polyphase, and whose secondary winding 17 is connected by wires 18 and 19 to opposite terminals of the Wheatstone bridge 14. The intermediate terminals of the Wheatstone bridge are connected in the usual manner to a null point indicator 20 which is of a type adapted for operation by alternating current. Said null point indicator may be provided with energizing circuit connections 25 and 26, including resistance or lamp 27, for the field magnet coil thereof, so as to apply say 110 volts to said coil, to produce a magnetic field which operates upon an armature coil connected by circuit wires 28 and 29 to the intermediate terminals of the Wheatstone bridge in the usual manner of such alternating current measuring means. Any other electrical measuring means, responsive to alternating current may, however, be used. The transformer used may be of the iron core type, transforming for example from 110 to 6 volts, the latter voltage being applied to the wires 18 and 19 leading to the end terminals of the Wheatstone bridge, and the circuit connections leading to the electrode means being included in one arm of the Wheatstone bridge in the usual manner of such electrical measuring devices. By maintaining only about 6 volts in the lines leading to the electrodes I ensure operation of the system even when the cable insulation has become damaged by oil or otherwise as long as there is no actual short circuit.

In order that the electrode means shall operate effectively under the conditions existing in the column of liquid in the test operation as hereinafter set forth it is necessary that the surface of the electrodes which are in contact with the liquid not be wetted by oil but only by water and saline solutions. For this purpose I have found it desirable to coat the surface of the metal body or conductors forming the electrodes with a gelatinous substance and I have found that either gelatinous silica or agar may be used advantageously for this purpose. The gelatinous silica is however only applicable to platinum or gold electrodes or to their acid resisting alloys. To coat such an electrode I allow water glass of about 1.15 sp. gr. to harden in a thin film upon the electrode and then immerse it in a very dilute solution of mineral acid, which in the course of a few hours will form a gelatinous coating of silicic acid. This is then washed free of electrolytes and kept in a water saturated atmosphere until ready for use.

With the baser metals such as nickel (which I prefer to use in actual field work) I simply coat the cleaned electrode surface with a thin film of agar dissolved (dispersed) in hot distilled water, by dipping the electrode in the agar infusion and allowing to set, repeating the dipping and setting until a uniform and thin film is obtained over the entire electrode surface. The electrode after the agar has set is kept in water until ready for use. It is also of advantage to first cover the cleaned electrode with a fine cambric cloth and then saturate this cloth with hot agar infusion and build up on this covering a fine glaze of set agar. It is also of advantage, for particularly severe usage, to harden the agar by a hardening agent such as formaldehyde or alum, but this is generally not necessary.

A cambric covered agar coated set of electrodes I have found to be in excellent mechanical and electrical condition after making six round trips to the bottom of a 5000 foot bore hole.

The electrodes so coated with the oil repelling film, give in the laboratory when tested against uncoated electrodes practically the same readings instantly. That is it takes but an instant for the electrolyte or rather the ions to penetrate the film.

As a practical illustration of the application of my invention for locating the position in a bore hole of the point of ingress of saline water I proceed as follows:

In Figs. 1 and 2 the well is shown diagrammatically, the "oil string" being indicated at 21 and the "water string" at 22. The oil string is provided with the usual perforations adjacent the oil sands, and the water string is cemented in the usual manner to cement off water strata above the oil sands. The hole is first conditioned by circulating through a string of tubing, indicated at 23 in Fig. 1 and reaching from top to bottom of the bore hole, a supply of fresh water until it flows freely out of the top of the casing and until substantially all of the original fluid of the hole is displaced. During such washing operation, the fresh water not only displaces the water from the bore hole and fills the same, but may also penetrate the surrounding strata to a certain extent as indicated at 30 in Fig. 1, the oil and salt water existing in such strata being thereby forced back away from the bore hole, as at 31. The tubing 23 is then removed from the bore hole leaving in the bore hole a column of fresh water which may extend almost to the top of the bore hole and which in general will be considerably above the original "fluid level" for the bore hole. I have found that under these conditions there is a tendency for the salt water of relatively high saline concentration present in the so-called water strata or water sands to diffuse into the column of fresh water in the bore hole producing zones of relatively sharp difference in saline concentration at parts of the water column opposite such water strata or the water sand. Under these conditions there will therefore be opposite each point of ingress of saline water a zone or column of water whose salinity is decidedly greater than the balance of the water in the hole. The properly connected electrode means as shown in Fig. 4, is now lowered by means of the reel 6 into the hole as shown in Fig. 2 and the resistance is kept balanced for each space interval as indicated by the markers 16, the value of this resistance is recorded and this operation is continued until the bottom of the hole is reached. On pulling out reverse readings are or may be taken at the various points as a check. These results are plotted against the depth, for example as shown in Fig. 5 by curve $c-c$. The resulting curve will show strong points of inflection such as indicated at $h_1$ and $h_2$ opposite the points of ingress of the saline water. The resistance of the solution between the electrodes may be measured and plotted in any suitable units or as shown in Fig. 5, such resistances may be conveniently plotted as "relative resistances," any convenient resistance, for example the resistance, between the electrodes, of the fresh water used in washing out the bore hole, being taken as an arbitrary 100% resistance.

During the washing operation, salt water originally present in the bore hole may enter an oil stratum due to the abnormal pressure in the bore hole, and when the water tube is withdrawn, such salt water may re-enter the bore hole as at 33 in Fig. 2 and cause an increase in salinity of the water opposite such oil stratum, so that in the first series of conductivity measurements, there may appear a false indication of a water stratum at such point. As a further check on the operation and for the purpose of eliminating such accidental conditions which may exist in the water column due to presence of salt water in the column, and particularly at its upper portion, on account of returning salt water from an oil stratum as above described, or any causes other than by infiltration from the water strata proper, I prefer to make a series of successive measurements in the following manner:

A standard of resistance is first determined by immersing the electrodes in a salt solution consisting of or corresponding in concentration to the salt solution from the water sand or water strata and originally present in the bore hole before the same was filled with fresh water. The resistance corresponding to this concentration is measured and plotted on a sheet of plotting paper, as indicated by the line $b-b$ in Fig. 5. Measurements are then made at successive heights or points in the water column in the bore hole after withdrawal of the fresh water supply tubing and such measurements are plotted as indicated by the curve shown at $c-c$ in Fig. 5. The water in the bore hole is then bailed out to a somewhat lower level and a series of measurements is taken at different heights or levels in the bore hole giving a second series of resistance readings which are plotted as indicated by curve $d-d$. The water in the bore hole is then bailed out to a further lower level and another series of resistance readings taken at different levels and another curve $e-e$ plotted. At each successive operation of this kind the resistance for corresponding points or levels in the bore holes decreases owing to increase of salinity by continued diffusion and flow of saline water from the water sands, but in addition to this effect there is found to be a very much sharper deflection of the zones of relatively low resistance corresponding to the locations of the water stratum or strata, and I have also found that by such successive measuring operations accidental abnormalities in saline concentration or in resistance due to causes other than diffusion from a water stratum can be eliminated. Thus as shown in Fig. 5 there may be presented in the first measurement a zone or point of relatively low resistance indicated at $h_0$, which is not found in the curve corresponding to subsequent check measurements and which may therefore be assumed to be due to accidental causes and not to indicate the position of a water bearing stratum. Any desired number of successive check readings may be made as above described until the location of the water bearing stratum or strata is sufficiently defined but in general it will be desirable to continue the successive operations of bailing out to lower levels followed by resistance measurements at different heights until the resistance indicated by each point $h_1$, $h_2$, etc., approaches the standard resistance indicated by the line $b$—$b$.

In some cases, when the water entering the bore hole from the water stratum has relatively low salinity, it will be desirable to introduce into the well (instead of fresh water) water of relatively high salinity, the reading for a zone opposite such a water stratum thus indicating relatively high resistance, and in general my invention provides for establishing in the bore hole a water column of different saline concentration from that of the water in the water bearing stratum to be located, and then determining the location in such a water column of any zone differing in salinity from the normal salinity of such water column.

To carry out the invention most effectively the following conditions should be observed:

First, the bore hole must be conditioned so as to produce a sharp difference in concentration between the water or fluid opposite the water bearing strata and the rest of the water or fluid in the hole.

Second, the electrodes used for measuring the resistance must be so prepared and treated that they will not be wet by oil or oil-water emulsions but only by water and saline solutions.

Third, the current used for such measurements should preferably be alternating to prevent the electrolysis of the saline solution with its possible resulting polarization which would give erroneous values for the resistance measurements.

Fourth, the current used (alternating) must originate in such a manner that the circuit for measuring the resistance will at all times be free from an electrical ground to the bore hole casing.

In regard to the requirement above stated as to the nature of the electrode surfaces that are exposed to the liquid, it may be pointed out that the column of fluid standing in the hole usually has at its top a layer of oil or oil-water emulsion varying from a few feet to several hundred feet in depth and below this to the bottom there will inevitably be patches of oil or oil saturated gas, which enter the bore hole. These substances adhere most tenaciously to all metals known to me that could be used for electrodes and would prevent the accurate reading of the resistance between the electrodes. This was found to be a serious difficulty in the early attempts at operation of the process. Encasing the electrode in an ordinary filter medium was found to be useless in that the filter became coated with oil and clogged up immediately on coming in contact with it. I have found however that the principle of adsorption offers a solution to this all important problem, and by coating the electrode as above described with a thin film of gelatinous material which would not be wetted by oil but only by water and saline solutions, this difficulty was overcome.

The steps of conditioning the well with fresh water and then measuring the electrical conductivity at various points in the depth of the well, as herein described, is claimed in my copending application No. 702,946 filed Mar. 29, 1924. (U. S. Patent No. 1,536,007, April 28, 1925.)

Apparatus as described in the present case and as illustrated in the drawing is not claimed herein, but in a copending application 735,330, filed September 2, 1924.

The electrode means shown in the present case are not claimed herein, but in a copending application 756,156, filed December 15, 1924.

What I claim is:

1. The method of determining the location of water bearing strata in bore holes which consists in establishing in the bore hole a column of water of relatively low saline concentration and permitting the formation therein of zones of relatively high concentration opposite each water bearing stratum, measuring the saline concentration at different heights in the said column, to determine the location of such zones of relatively high saline concentration, withdrawing water from such column to lower the upper level thereof, and repeating the measurement of saline concentration at different levels in said column to give a more exact and sharper indication of the location of zones of relatively high saline concentration.

2. The method of determining the location of water bearing strata in bore holes which consists in establishing in the bore hole a column of water of relatively low saline concentration and permitting the formation therein of zones of relatively high concentration opposite each water bearing stratum, measuring the electrical resistance of the liquid at different heights in the said column, to determine the location of such zones of relatively high saline concentration, withdrawing water from such column to lower the upper level thereof, and repeating the measurement of electrical resistance of the liquid at different levels in said column to give a more exact and sharper indication of the location of zones of relatively high saline concentration.

3. The method of determining the location of water bearing strata in bore holes which consists in establishing in the bore hole a column of water of relatively low saline concentration and permitting the formation therein of zones of relatively high concentration opposite each water bearing stratum, measuring the electrical resistance of the liquid at different heights in the said column, to determine the location of such zones of relatively high saline concentration, successively withdrawing water from such column to lower the upper level thereof in a plurality of steps, and repeating the measurement of electrical resistance of the liquid at different levels in said column at each of said stages of the water column to give a more exact and sharper indication of location of zones of relatively high saline concentration.

4. The method of determining the location of a water bearing stratum in a bore hole in which salt water is present from such stratum which comprises introducing into the bore hole at the lower portion thereof, fresh water in amount sufficient to displace the salt water in the bore hole, and then making successive measurements of saline concentration at different levels in the resulting water column remaining in the bore hole after the discontinuance of said water supply so as to determine the location of a zone of relatively high saline concentration in said water column, resulting from diffusion of salt into said zone from an adjacent water stratum, thereafter withdrawing water from said column so as to lower the upper level thereof after the measurements aforesaid have been made and thereafter making a further series of saline concentration measurements at different levels in the water column after the upper level of the water column has thus been lowered so as to give a more exact and sharper indication of the location of zones of relatively high saline concentration.

5. The method of determining the location of a water bearing stratum in a bore hole in which water is present from such stratum which consists in introducing into the bore hole at the lower portion thereof, water of different saline concentration from that of the water in the water bearing stratum, until there is produced in the bore hole, a water column of different saline concentration from the water in the water bearing stratum, discontinuing such water supply and making successive measurements of saline concentration at different levels in the resulting water column remaining in the bore hole after the discontinuance of the said water supply so as to determine the location of any zone of the water column having a different saline concentration from the remainder of said column, resulting from diffusion of aqueous liquid into said zone from an adjacent water stratum, thereafter withdrawing water from said column so as to lower the upper level thereof, and thereafter making a further series of measurements of the saline concentration at different levels in the water column so as to give a more exact and sharper indication of the location of the zone of different saline concentration from the remainder of the column.

6. The method of determining the location of a water bearing stratum in a bore hole, which consists in establishing within the bore hole a water column of different saline concentration from that of the water in the water bearing stratum, and permitting therein the formation opposite to the water bearing stratum, of a zone of different saline concentration from the rest of the column by diffusion from said stratum into said zone, measuring the saline concentration at different heights in said column, withdrawing water from said column so as to lower the upper level thereof and repeating the measurement of saline concentration at different levels in said column, so as to definitely determine the location of such zone of different saline concentration opposite such water bearing stratum.

7. A process as set forth in claim 6 in which the measurement of saline concentration is effected by measurement of the relative electrical resistance at different levels in the said column.

8. In determining the location of water-bearing strata in bore holes, the steps of lowering the liquid level in the bore hole a short distance and determining the relative electrical conductivity of the aqueous liquid at many points in the depth thereof, and repeating such sequence of steps a plurality of times, until sharp differences in the electrical conductivity are definitely located.

In testimony whereof I have hereunto subscribed my name this 21st day of August, 1924.

FREDERICK W. HUBER.